United States Patent
Li et al.

(10) Patent No.: US 12,410,764 B1
(45) Date of Patent: Sep. 9, 2025

(54) DETACHABLE STRUT STRUCTURE IN COMBUSTION CHAMBER OF SCRAMJET-OBLIQUE DETONATION ENGINE

(71) Applicant: Nanjing University of Aeronautics and Astronautics, Nanjing (CN)

(72) Inventors: Jianzhong Li, Nanjing (CN); Longgang Li, Nanjing (CN); Qiongyao Qin, Nanjing (CN); Yidong Liu, Nanjing (CN); Mingze Yuan, Nanjing (CN); Tianyong Ji, Nanjing (CN)

( * ) Notice: Subject to any disclaimer, the term of this patent is extended or adjusted under 35 U.S.C. 154(b) by 0 days.

(21) Appl. No.: 19/007,487

(22) Filed: Jan. 1, 2025

(30) Foreign Application Priority Data

Oct. 9, 2024 (CN) .......................... 202411403320.1

(51) Int. Cl.
*F02K 7/14* (2006.01)
*F23R 7/00* (2006.01)

(52) U.S. Cl.
CPC . *F02K 7/14* (2013.01); *F23R 7/00* (2013.01)

(58) Field of Classification Search
CPC ..... F02K 7/10; F02K 7/14; F02K 9/42; F02K 9/48; F23R 7/00
See application file for complete search history.

(56) References Cited

U.S. PATENT DOCUMENTS

| | | | |
|---|---|---|---|
| 2,995,317 A * | 8/1961 | Schoppe .................... | B64C 9/38 60/228 |
| 3,439,692 A * | 4/1969 | Pike ......................... | F02C 7/042 137/15.2 |
| 4,991,795 A * | 2/1991 | Koncsek ................. | F02C 7/042 137/15.1 |
| 5,941,064 A * | 8/1999 | Chevalier ................. | F23R 3/20 60/768 |
| 6,883,330 B2 * | 4/2005 | Guinan ..................... | F02K 7/14 60/768 |
| 9,027,324 B2 * | 5/2015 | Snyder ..................... | F23M 9/06 60/39.38 |

(Continued)

FOREIGN PATENT DOCUMENTS

| | | | | |
|---|---|---|---|---|
| CA | 2761484 A1 * | 6/2013 | ............... | F23R 3/16 |
| CN | 110159434 A * | 8/2019 | ............... | F02K 1/06 |

(Continued)

*Primary Examiner* — Craig Kim
(74) *Attorney, Agent, or Firm* — Addison D. Ault; IPGentlemen Intellectual Property Services, LLC

(57) ABSTRACT

A detachable strut structure in a combustion chamber of a scramjet-oblique detonation engine includes two strut components and two hydraulic telescopic mechanisms. The strut components are disposed in the combustion chamber, the combustion chamber defines an inlet and an outlet, and a connection between the inlet and the outlet is a centerline, and the two strut components are mirrored and arranged on two sides of the centerline respectively. Each strut component includes a first surface, a second surface, a third surface, the first surface is arranged parallel to the centerline, the second surface is arranged on a side of the first surface close to the inlet. An angle α is defined between the second and first surfaces. The third surface is arranged on a side of the first surface close to the outlet, an angle β is defined between the third surface and an extension line of the first surface.

9 Claims, 4 Drawing Sheets

(56) References Cited

U.S. PATENT DOCUMENTS

| | | | |
|---|---|---|---|
| 11,320,147 B2 * | 5/2022 | Pal | F02K 7/08 |
| 11,421,628 B2 * | 8/2022 | Segal | F02K 7/14 |
| 11,970,993 B2 * | 4/2024 | Pal | F02K 7/10 |
| 11,970,995 B2 * | 4/2024 | Duggleby | F02K 9/48 |
| 12,308,491 B2 * | 5/2025 | Roberts | H01M 8/04022 |
| 2010/0223933 A1 * | 9/2010 | Umeh | F02C 7/22 60/773 |
| 2017/0009665 A1 * | 1/2017 | Ueno | F02C 7/222 |
| 2019/0264918 A1 * | 8/2019 | Pal | F02K 7/10 |
| 2019/0264919 A1 * | 8/2019 | Pal | F02K 7/08 |
| 2020/0271074 A1 * | 8/2020 | Erickson | F02K 3/077 |
| 2024/0287952 A1 * | 8/2024 | Pal | F23R 7/00 |

FOREIGN PATENT DOCUMENTS

| | | | | |
|---|---|---|---|---|
| CN | 113048516 B | * | 4/2022 | F23R 7/00 |
| CN | 119178170 A | * | 12/2024 | F23R 3/286 |
| CN | 119491783 A | * | 2/2025 | G05B 19/0423 |
| CN | 119492055 A | * | 2/2025 | F23R 7/00 |
| CN | 120008865 A | * | 5/2025 | |
| EP | 1898080 A2 | * | 3/2008 | F02K 7/10 |

\* cited by examiner

DETACHABLE STRUT STRUCTURE IN COMBUSTION CHAMBER OF SCRAMJET-OBLIQUE DETONATION ENGINE

TECHNICAL FIELD

The disclosure relates to the technical field of aero-engines, and particularly to a detachable strut structure in a combustion chamber of a scramjet-oblique detonation engine.

BACKGROUND

Scramjet engines, with their advantages of high specific impulse and fast speed, have become a hot topic of research for scientific institutions both domestically and internationally. The composition of the scramjet engine is roughly divided into four parts: an intake (also referred to as inlet), an isolator, a combustion chamber, and a tail nozzle. In terms of the working process of the combustion chamber in the scramjet engine, it mainly includes the mixing and injection of fuel with the incoming flow, ignition, and subsequent flame stabilization process. The incoming air flows through the intake into the combustion chamber, with the intake speed at Mach 4 or higher, which is then reduced to Mach 1-3 after compression. The fuel is injected into the supersonic incoming flow, and mixed and reacted with the air, and the combustion mode in the combustion chamber is mainly diffusion mode. Once the combustion chamber is ignited, the flame gradually develops the downstream of the combustion chamber, maintaining stable combustion throughout the main combustion area. However, in the combustion chamber, due to the incoming flow speed being much greater than the flame propagation speed, the convective heat transfer intensity of the mixed gas is significantly enhanced in the high-speed flow, and the low-temperature mixture in the early development stage greatly affects the combustion of the flame, resulting in the flame being easily extinguished. Therefore, how to stabilize the flame in a hypersonic airflow and achieve uniform mixing of the fuel with the incoming air is an urgent problem to be solved. Moreover, in hypersonic propulsion systems, there is currently no air-breathing power that can independently meet the needs of near-space vehicles over a wide speed range. For flight above Mach 9, using the oblique detonation engine is almost the only feasible solution, making combined engines become a new direction for research.

Currently, to address the problem of stabilizing flames in hypersonic airflow and achieving uniform mixing of the fuel with incoming air, the solutions typically include reducing the incoming flow velocity or increasing the flame propagation speed. However, increasing the flame propagation speed requires an introduction of external energy sources such as lasers, which does not have practical application value. Another approach favored by some scholars is to add intrusive devices within the combustion chamber, the most common of which is a strut structure. For example, the relevant strut structures disclosed in the Chinese patents with publication numbers of CN116817314A and CN115789698A, work by creating a recirculation zone at a bottom of the strut, essentially creating a subsonic area where the airflow can linger. However, the strut structures only have the recirculation zone at the bottom, primarily serving to stabilize the flame, and are difficult to transition to a higher oblique detonation mode, thus they cannot be used in a scramjet-oblique detonation combined engine.

SUMMARY

The purpose of the disclosure is to provide a detachable strut structure in a combustion chamber of a scramjet-oblique detonation engine (also referred to as scramjet-oblique detonation combined engine), which can stabilize the flame under hypersonic airflow in a merged state of the support struts to achieve stable combustion in the combustion chamber, and can control the flame to extinguish in a separated state of the support struts, while maintaining the fuel filling the combustion chamber to facilitate the transition to the oblique detonation wave mode.

The technical solutions of the disclosure are as follows.

The detachable strut structure in a combustion chamber of a scramjet-oblique detonation engine includes two strut components and two sets of hydraulic telescopic mechanisms. The strut components are disposed in the combustion chamber, the combustion chamber defines an inlet and an outlet, a connection between the inlet and the outlet is a centerline, and the two strut components are mirrored and arranged on two sides of the centerline respectively. Each of the two strut components includes a first surface, a second surface, and a third surface, the first surface is arranged parallel to the centerline, and the second surface is arranged on a side of the first surface close to the inlet. An angle $\alpha$ is defined between the second surface and the first surface, and the angle $\alpha$ is arranged facing towards the outlet. The third surface is arranged on a side of the first surface close to the outlet, an angle $\beta$ is defined between the third surface and an extension line of the first surface, and the angle $\beta$ is arranged facing towards the outlet. Both the angle $\alpha$ and the angle $\beta$ are acute angles, and the angle $\alpha$ is less than or equal to the angle $\beta$. The two sets of hydraulic telescopic mechanisms are connected to side walls of the two strut components, respectively. The two sets of hydraulic telescopic mechanisms are configured to control the two strut components to separate and merge in a vertical direction. When the two strut components are merged, an oblique shock wave is generated at the angle $\alpha$ of each of the two strut components as gas flows towards the combustion chamber. When the two strut components are separated, the first surfaces of the two strut components are parallel to the gas flow entering the combustion chamber, generating shock waves without interfering with each other, and expansion waves are generated at the angle $\beta$ of the two strut components.

In an embodiment, the angle $\alpha$ is in a range of 6°-10°, and the angle $\beta$ is in a range of 28°-32°.

In an embodiment, the angle $\alpha$ is 6°, and the angle $\beta$ is 30°.

In an embodiment, each of the two strut components further includes a fourth surface and a fifth surface. The fourth surface is vertically disposed and connected to the third surface, and the fifth surface is parallel to the first surface. Two ends of the fifth surface are respectively connected to the fourth surface and the second surface.

In an embodiment, a ratio of a width of each strut component to a length of the first surface is 48:95, a ratio of a vertical distance between the first surface and the fifth surface to the length of the first surface is 2:19, and a ratio of a height of the fourth surface to the vertical distance between the first surface and the fifth surface 25 is 2:5.

In an embodiment, the fourth surface of each of the two strut components defines multiple fuel spray holes along a width direction of the fourth surface. A side wall of each of the two strut components defines a fuel delivery port and an oxygen delivery port, and the multiple fuel spray holes are connected respectively to the fuel delivery port and the oxygen delivery port.

In an embodiment, a ratio of an aperture of each of the multiple fuel spray holes to the height of the fourth surface is 1:2.

In an embodiment, the two strut components are made of a high-thermal conductivity material.

In an embodiment, a horizontal distance between the first surface of each of the two strut components and the inlet of the combustion chamber is greater than or equal to 35 millimeters (mm).

Compared with the related art, the beneficial effects of the disclosure are as follows.

(1) The disclosure provides the two sets of hydraulic telescopic mechanisms, and is capable of merging and separating the two strut components in the vertical direction to achieve stable combustion in the combustion chamber or to control the extinguishing of flames.

When the two strut components are merged, they are positioned at a center of the combustion chamber. At this point, the bottoms of the two strut components supply fuel to the combustion chamber. The angles α of the two strut components induce the generation of the oblique shock waves, which, after reflection from the chamber walls, form a complex series of shock waves. This can reduce the airflow speed inside the combustion chamber, increase its temperature, and extend a residence time of the airflow and the fuel within the combustion chamber. As a result, better mixing effects are achieved, and a more favorable environment for ignition is created, which is conducive to ignition and flame stabilization. Additionally, the vortices generated at the third surfaces near the tails of the two strut components facilitate the mixing of fuel and air, reducing the inlet airflow speed to ease ignition and subsequent stable combustion.

During the vertical separation movement of the two strut components, the expansion wave is generated at the angle β between the first surface and the third surface of each of the two strut components, which reduces the shock waves reflected by the wall surfaces, thereby lowering the temperature to extinguish the flame. Therefore, compared to traditional support strut structures that require the disconnection of fuel supply to extinguish the flame, the two strut components of the disclosure can extinguish the flame without disconnecting the fuel supply, maintaining the fuel to fill the combustion chamber cavity, facilitating the transition to the oblique detonation mode, and providing a supplement to the propulsion technology of the scramjet-oblique detonation engine.

(2) When the two strut components are in a separated state, their first surfaces are parallel to the incoming flow, generating the shock waves without interfering with each other. The angle β between the first surface and the third surface of each of the two strut components can produce the expansion waves to weaken an intensity of the shock waves reflected by the wall surfaces, reducing the total pressure loss caused by the oblique shock waves.

DETAILED DESCRIPTION OF EMBODIMENTS

Referring to FIGS. 1 to 8, a detailed description of a specific embodiment of the disclosure is provided below. In the description of the disclosure, it should be understood that terms such as "center," "up," "down," "front," "back," "left," "right," "vertical," "horizontal," "top," "bottom," "inside," and "outside" indicate directions or positional relationships based on the orientation or position shown in the attached drawings. These terms are used solely for the purpose of describing the disclosure and simplifying the description, and do not indicate or imply that the devices or components must have specific orientations or be constructed and operated in specific orientations. Therefore, they should not be construed as limitations on the disclosure.

The terms "first" and "second" are used solely for descriptive purposes and should not be understood as indicating or implying relative importance or implicitly specifying the number of technical features referred to. Thus, features defined as "first" or "second" may explicitly or implicitly include one or more of those features. In the description of the disclosure, unless otherwise specified, the term "multiple" means two or more.

The current strut component is an integrated structure, as disclosed in the related strut components of patents with publication numbers of CN116817314A and CN115789698A. The working principle of the strut components is to create a recirculation zone at a bottom of the support strut, essentially forming a subsonic area where the airflow can linger. However, the strut components only have a recirculation zone at the bottom, primarily serving to stabilize the flame. When it is necessary to switch to an oblique detonation mode, the flame needs to be extinguished, and the fuel must continue to fill the combustion chamber. The conventional strut components mentioned do not have the function of extinguishing the flame on their own and can only extinguish the flame by cutting off the fuel supply. Therefore, they do not have the capability to switch to the oblique detonation mode, making it difficult to apply them to the scramjet-oblique detonation engine.

Figure 1:
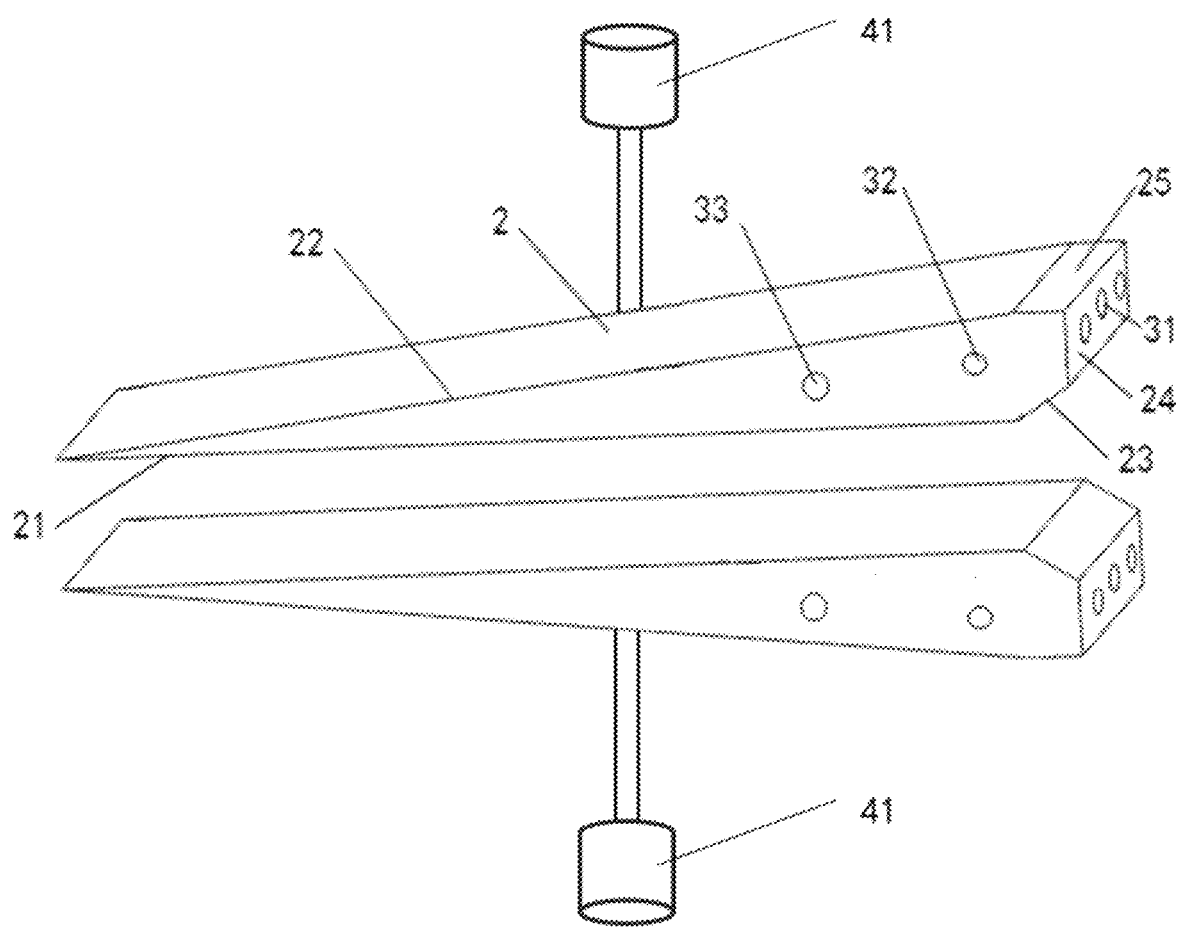
FIG. 1 illustrates a schematic three-dimensional diagram of a detachable strut structure in a combustion chamber of a scramjet-oblique detonation engine of the disclosure.
Figure 2:
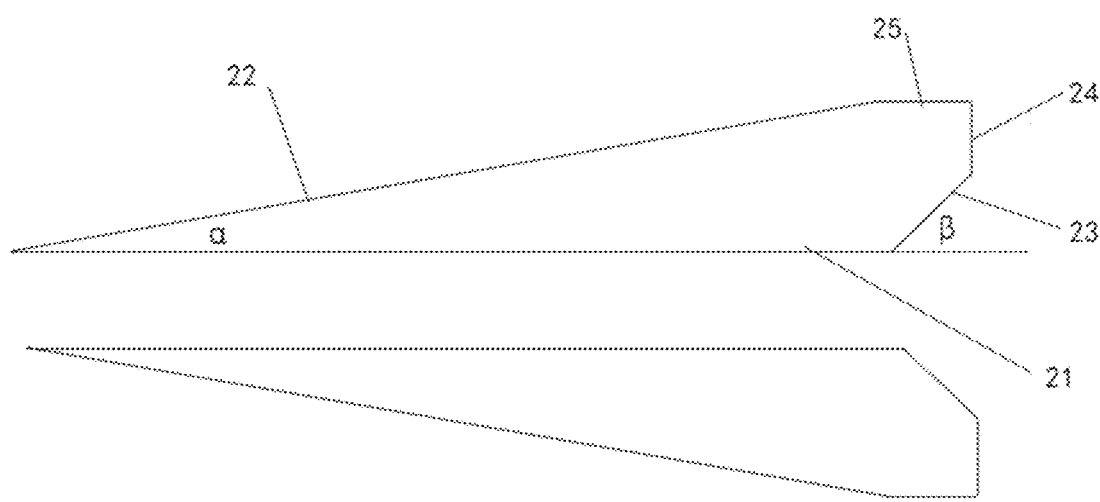
FIG. 2 illustrates a schematic front view of the detachable strut structure in the combustion chamber of the scramjet-oblique detonation engine of the disclosure.

Based on the above problems, a detachable strut structure in a combustion chamber of a scramjet-oblique detonation engine is provided. As shown in FIGS. 1 and 2, the detachable strut structure in a combustion chamber of a scramjet-oblique detonation engine includes two strut components 2 and two sets of hydraulic telescopic mechanisms 41. The two strut components 2 are disposed in the combustion chamber, the combustion chamber 1 defines an inlet 41 and an outlet 42, a connection between the inlet 41 and the outlet 42 is a centerline, and the two strut components 2 are mirrored and arranged on two sides of the centerline respectively. Each of the two strut components 2 includes a first surface 21, a second surface 22, and a third surface 23. The first surface 21 is arranged parallel to the centerline, and the second surface 22 is arranged on a side of the first surface 21 close to the inlet 41. An angle α is defined between the second surface 22 and the first surface 21, and the angle α is arranged facing towards the outlet 42. The third surface 23 is arranged on a side of the first surface 21 close to the outlet 42, and an angle β is defined between the third surface 23 and an extension line of the first surface 21. The angle β is arranged facing towards the outlet 42, both the angle α and the angle β are acute angles, and the angle α is less than or equal to the angle β. The two sets of hydraulic telescopic mechanisms 41 are connected to side walls of the two strut components 2, respectively. The two sets of hydraulic telescopic mechanisms 41 are configured to control the two strut components 2 to separate and merge in a vertical direction. When the two strut components 2 are merged, an oblique shock wave is generated at the angle α of each of the two strut components 2 as gas flows towards the combustion chamber 1. When the two strut components 2 are separated, the first surfaces 21 of the two strut components 2 are parallel to the gas flow entering the combustion chamber 1, generating shock waves without interfering with each other, and expansion waves are generated at the angle β of the two strut components 2.

In the embodiment, the two sets of hydraulic telescopic mechanisms 41 are used to merge the two strut components 2, the angle α at a front of each strut component 2 induces the generation of the oblique shock waves, which, after reflection from the wall surfaces, form a complex series of the shock waves. This reduces the incoming flow speed and increases its temperature, which is conducive to ignition and flame stability. At the same time, the third surface at a tail of each of the two strut components 2 generates vortices, enhancing fuel mixing and allowing for a uniform mixture of the fuel and the incoming flow. When the two strut components 2 are in a separated state, the first surface 21 of each strut component 2 is parallel to the gas flow entering the combustion chamber, producing the shock waves without interfering with each other. Meanwhile, the angle β between the third surface 23 and the first surface 21 of each of the two strut components generates the expansion wave to weaken an intensity of the shock waves reflected by the wall surfaces, reducing total pressure loss and enhancing the ignition capability of the combustion chamber. This also reduces the temperature to extinguish the flame, facilitating the subsequent transition to an oblique detonation mode.

In an embodiment, as shown in FIG. 2, during the design phase, the angle α is in a range of 6°-10°, which avoids the generation of overly strong the oblique shock waves. The angle β is in a range of 28°-32°, which prevents the generation of the expansion waves that are too weak, thus avoiding the issue of being unable to achieve the desired cooling effect. In a specific embodiment, as shown in FIG. 3, the angle α is 6° and the angle β is 30°.

in the embodiment, as shown in FIGS. 1-2, each of the two strut components 2 further includes a fourth surface 24 and a fifth surface 25, the fourth surface 24 is vertically disposed and connected to the third surface 23, and the fifth surface 25 is parallel to the first surface 21. Two ends of the fifth surface 25 are respectively connected to the fourth surface 24 and the second surface 22.

Figure 3:
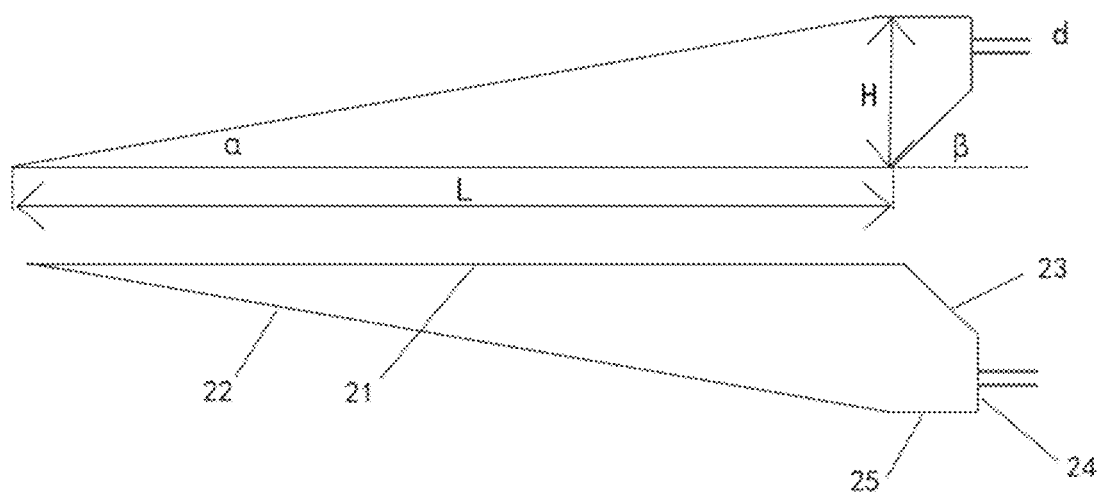
FIG. 3 illustrates another schematic front view with reference signs of the detachable strut structure in the combustion chamber of the scramjet-oblique detonation engine of the disclosure.
Figure 4:
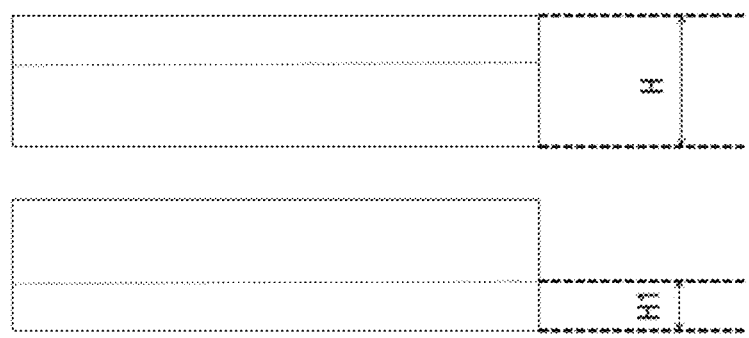
FIG. 4 illustrates a schematic side view with reference signs of the detachable strut structure in the combustion chamber of the scramjet-oblique detonation engine of the disclosure.
Figure 5:
FIG. 5 illustrates a schematic top view with reference signs of the detachable strut structure in the combustion chamber of the scramjet-oblique detonation engine of the disclosure.

As shown in FIGS. 3-5, a ratio of a width of each strut component 2 to a length of the first surface 21 is 48:95, a ratio of a vertical distance between the first surface 21 and the fifth surface 25 to the length of the first surface 21 is 2:19, and a ratio of a height of the fourth surface 24 to the vertical distance between the first surface 21 and the fifth surface 25 is 2:5. Specifically, the length L of the first surface 21 is 47.5 mm, the vertical distance H between the first surface 21 and the fifth surface 25 is 5 mm, the width W of the strut component 2 is 24 mm, and the height H1 of the fourth surface 24 is 2 mm.

In the embodiment, as shown in FIG. 1, the fourth surface 24 of each of the two strut components 2 defines multiple fuel spray holes 31 along a width direction of the fourth surface 24. A side wall of each of the two strut components 2 defines a fuel delivery port 32 and an oxygen delivery port 33, and the multiple fuel spray holes 31 are connected respectively to the fuel delivery port 32 and the oxygen delivery port 33. Specifically, in practice, the multiple fuel spray holes 31 are connected to the fuel delivery port 32 through a fuel delivery pipe and connected to the oxygen delivery port 33 through an oxygen delivery pipe.

In the embodiment, a ratio of an aperture of each of the multiple fuel spray holes (31) to the height of the fourth surface 24 is 1:2. Specifically, When the height of the fourth surface 24 is 2 mm, the aperture of the fuel spray hole 31 is 1 mm.

In the embodiment, the two strut components 2 are made of a high-thermal conductivity material. The high-thermal conductivity material is a stainless steel or a high-temperature alloy steel.

Figure 8:
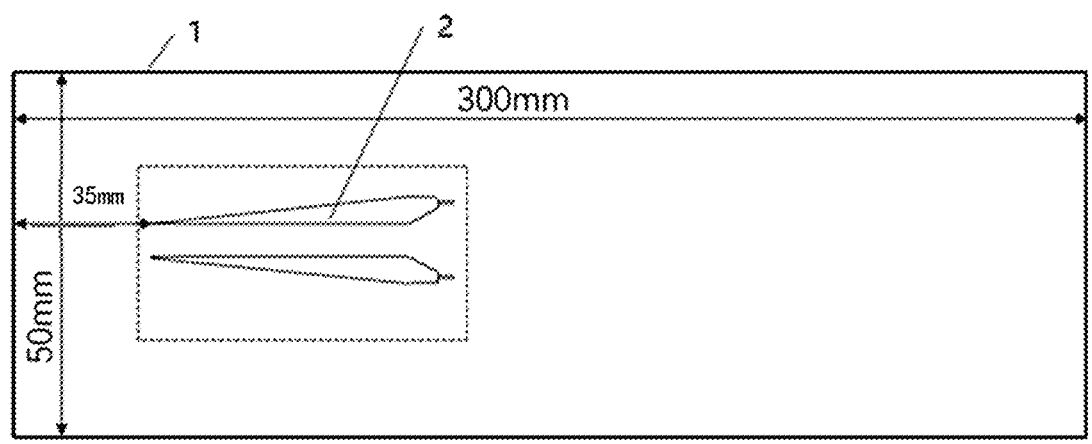
FIG. 8 illustrates a dimension diagram of the calculation model of the detachable strut structure in the combustion chamber of the scramjet-oblique detonation engine of the disclosure.

Specifically, as shown in FIG. 8, a length of the combustion chamber 1 is 300 mm and a height of the combustion chamber 1 is 50 mm. A left side of the combustion chamber is the inlet 41, and a right side of the combustion chamber is the outlet 42. The combustion chamber 1 is used to receive the supersonic airflow compressed by an intake and to create conditions for mixing and ignition. A horizontal distance between a front end of the first surface 21 of each strut component 2 and the inlet 41 of the combustion chamber 1 is greater than or equal to 35 mm, Specifically, the two sets of hydraulic telescopic mechanisms 41 are located on an upper side and a lower side of the combustion chamber 1. The hydraulic telescopic mechanisms 41 are hydraulic cylinders (not shown in FIGS). Piston rod ends of the two hydraulic cylinders are connected to the side walls of the two strut components via connecting rods that pass through the combustion chamber 1. By using the two sets of hydraulic cylinders, a distance between the two strut components can be controlled synchronously, either moving them away from each other or towards each other, achieving the separation and merging process of the two strut components.

The working principle of the disclosure is as follows.

Figure 6:
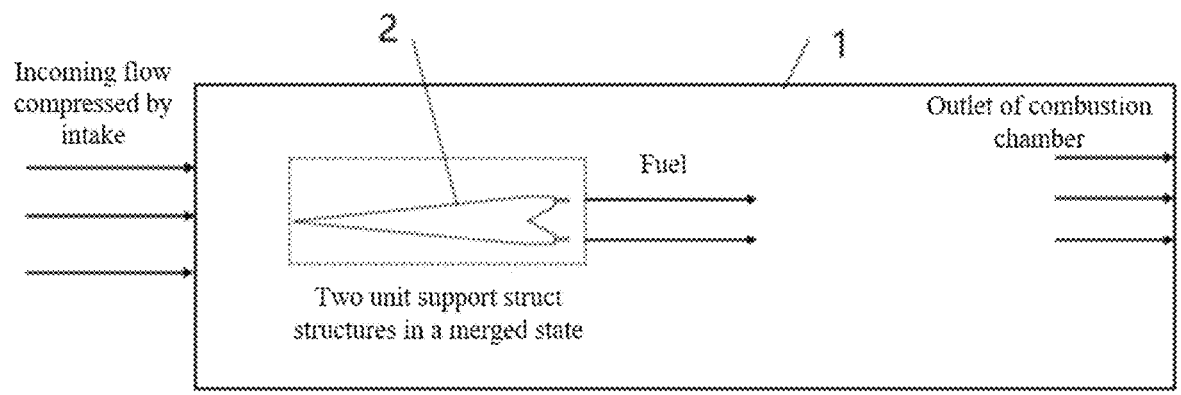
FIG. 6 illustrates a schematic diagram of a calculation model of the detachable strut structure in the combustion chamber of the scramjet-oblique detonation engine in a merged state of the disclosure.

Firstly, freestream air is compressed by the intake and enters the combustion chamber with corresponding increases in temperature and pressure, creating conditions for subsequent ignition. Inside the combustion chamber, the two strut components are initially in a merged state, with the multiple fuel spray holes at the tail ends of the strut components injecting fuel into the combustion chamber. The fuel injection scheme, as shown in FIG. 6, allows the incoming flow to mix with the fuel under the action of the shock wave train at the angles α of the strut components. The shock wave train can reduce the airflow speed inside the combustion chamber, increase the temperature, and extend the residence time of the airflow and the fuel, thereby achieving better mixing and a more favorable environment for ignition. Once the mixture is uniform and meets the ignition requirements, ignition is initiated. Near the multiple fuel spray holes at the tail of the two strut components, the area is fuel-rich with low oxygen concentration, and combustion and heat release cannot occur over a long distance. As the process moves downstream, the flame gradually stabilizes, chemical reactions proceed, and combustion products begin to form.

Figure 7:
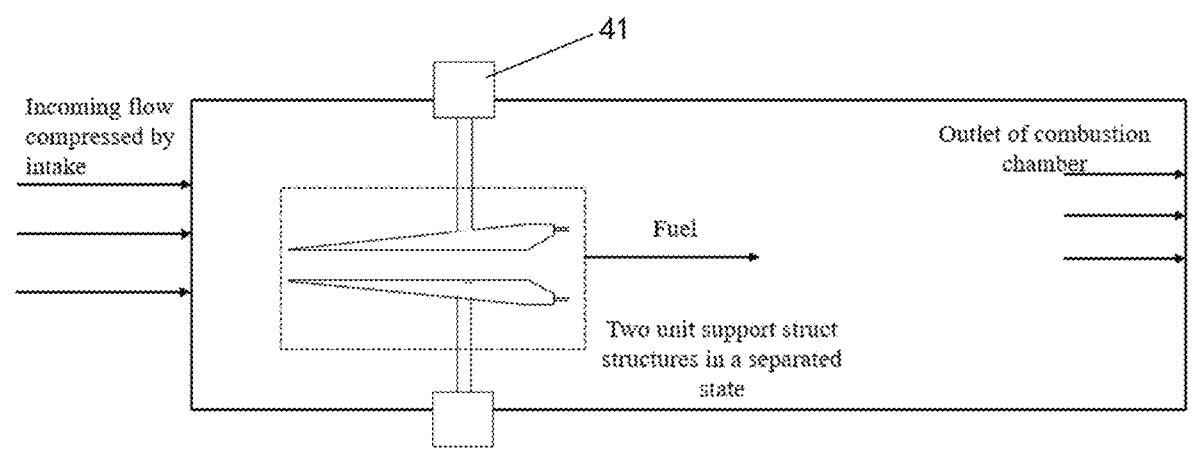
FIG. 7 illustrates a schematic diagram of the calculation model of the detachable strut structure in the combustion chamber of the scramjet-oblique detonation engine in a separated state of the disclosure.

As the flight Mach number increases, the two strut components are in a separated state, as shown in FIG. 7. The two strut components are driven to move apart in the vertical direction by the two sets of hydraulic telescopic mechanisms. After separation, the expansion waves are generated at the angles β of the tail ends of the two strut components to achieve the purpose of controlling flame extinguishment, facilitating the subsequent transition to the oblique detonation mode.

The above are only a few specific embodiments of the disclosure. However, the embodiments of the disclosure are not limited to these, and any changes that can be conceived by those skilled in the art should fall within the scope of protection of the disclosure.

What is claimed is:

1. A detachable strut structure in a combustion chamber of a scramjet-oblique detonation engine, comprising:
   two strut components (2), disposed in the combustion chamber; wherein the combustion chamber (1) defines an inlet (41) and an outlet (42), a connection between the inlet (41) and the outlet (42) is a centerline, and the two strut components (2) are mirrored and arranged on two sides of the centerline respectively;
   wherein each of the two strut components (2) comprises:
      a first surface (21), a second surface (22), and a third surface (23); the first surface (21) is arranged parallel to the centerline, and the second surface (22) is arranged on a side of the first surface (21) close to the inlet (41); an angle α is defined between the second surface (22) and the first surface (21), and the angle α is arranged facing towards the outlet (42); the third surface (23) is arranged on a side of the first surface (21) close to the outlet (42), an angle β is defined between the third surface (23) and an extension line of the first surface (21), and the angle β is arranged facing towards the outlet (42); both the angle α and the angle β are acute angles, and the angle α is less than or equal to the angle β;
   two sets of hydraulic telescopic mechanisms (41), connected to side walls of the two strut components (2), respectively; wherein the two sets of hydraulic telescopic mechanisms (41) are configured to control the two strut components (2) to separate and merge in a vertical direction, when the two strut components (2) are merged, an oblique shock wave is generated at the angle α of each of the two strut components (2) as gas flows towards the combustion chamber (1); when the two strut components (2) are separated, the first surfaces (21) of the two strut components (2) are parallel to the gas flow entering the combustion chamber (1), generating shock waves without interfering with each other, and expansion waves are generated at the angle β of the two strut components (2).

2. The detachable strut structure in the combustion chamber of the scramjet-oblique detonation engine as claimed in claim 1, wherein the angle α is in a range of 6°-10°, and the angle β is in a range of 28°-32°.

3. The detachable strut structure in the combustion chamber of the scramjet-oblique detonation engine as claimed in claim 2, wherein the angle α is 6°, and the angle β is 30°.

4. The detachable strut structure in the combustion chamber of the scramjet-oblique detonation engine as claimed in claim 1, wherein each of the two strut components (2) further comprises a fourth surface (24) and a fifth surface (25); the fourth surface (24) is vertically disposed and connected to the third surface (23), and the fifth surface (25) is parallel to the first surface (21); and two ends of the fifth surface (25) are respectively connected to the fourth surface (24) and the second surface (22).

5. The detachable strut structure in the combustion chamber of the scramjet-oblique detonation engine as claimed in claim 3, wherein a ratio of a width of each strut component (2) to a length of the first surface (21) is 48:95, a ratio of a vertical distance between the first surface (21) and the fifth surface (25) to the length of the first surface (21) is 2:19, and a ratio of a height of the fourth surface (24) to the vertical distance between the first surface (21) and the fifth surface (25) is 2:5.

6. The detachable strut structure in the combustion chamber of the scramjet-oblique detonation engine as claimed in claim 4, wherein the fourth surface (24) of each of the two strut components (2) defines multiple fuel spray holes (31) along a width direction of the fourth surface (24); a side wall of each of the two strut components (2) defines a fuel delivery port (32) and an oxygen delivery port (33), and the multiple fuel spray holes (31) are connected respectively to the fuel delivery port (32) and the oxygen delivery port (33).

7. The detachable strut structure in the combustion chamber of the scramjet-oblique detonation engine as claimed in claim 5, wherein a ratio of an aperture of each of the multiple fuel spray holes (31) to the height of the fourth surface (24) is 1:2.

8. The detachable strut structure in the combustion chamber of the scramjet-oblique detonation engine as claimed in claim 1, wherein the two strut components (2) are made of a thermal conductivity material.

9. The detachable strut structure in the combustion chamber of the scramjet-oblique detonation engine as claimed in claim 1, wherein a horizontal distance between the first surface (21) of each of the two strut components (2) and the inlet (41) of the combustion chamber (1) is greater than or equal to 35 millimeters (mm).

* * * * *